United States Patent Office 3,011,504
Patented Dec. 5, 1961

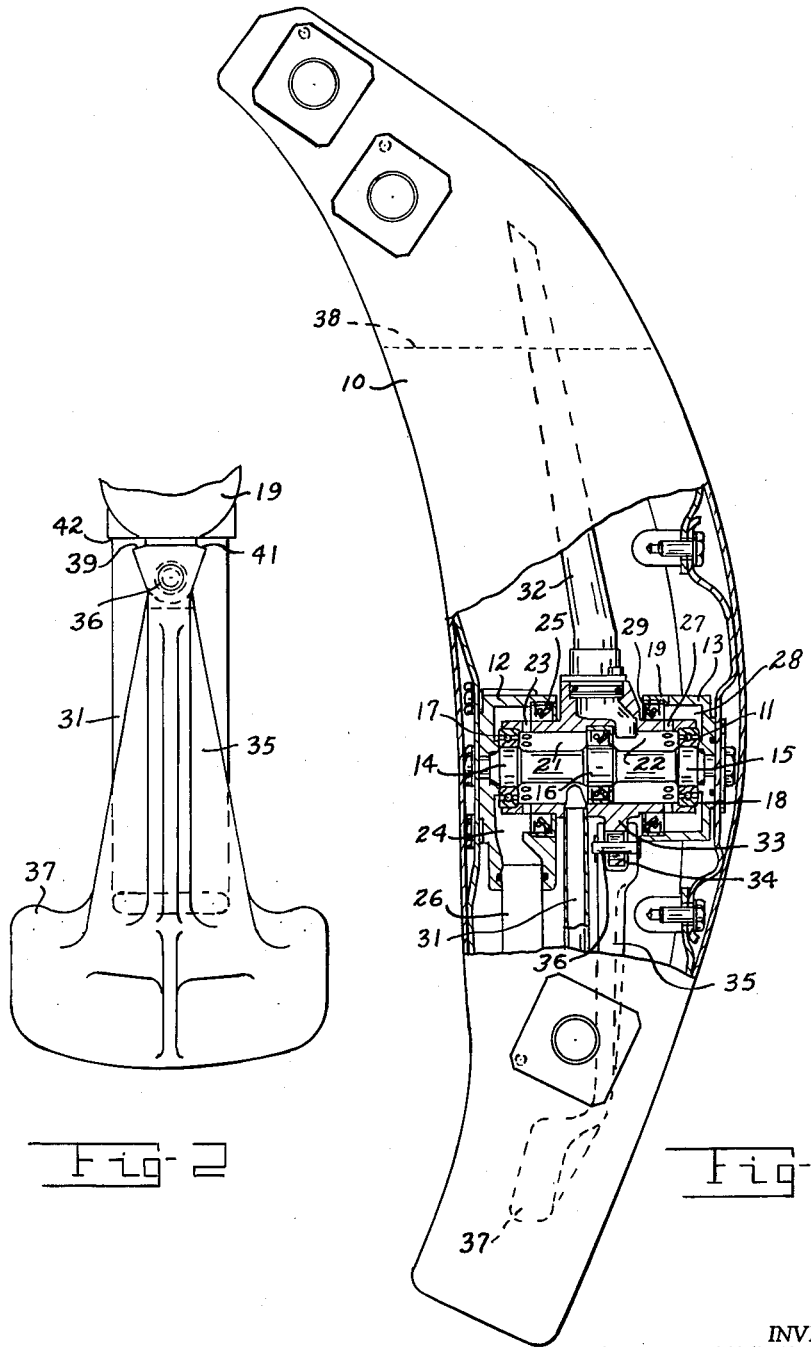
Dec. 5, 1961     W. C. KLANK, JR     3,011,504
LIQUID STORAGE TANK
Filed Jan. 8, 1960
INVENTOR.
WALTER C. KLANK, JR.
BY JE Beringer
HIS ATTORNEY

3,011,504
LIQUID STORAGE TANK
Walter C. Klank, Jr., Dayton, Ohio, assignor to United Aircraft Products, Inc., Dayton, Ohio, a corporation of Ohio
Filed Jan. 8, 1960, Ser. No. 1,362
2 Claims. (Cl. 137—45)

This invention relates to liquid storage tanks which in use assume different attitudes relative to the earth's surface. While not so limited, the invention has special reference to oil tanks in aircraft supplying hydraulic or engine lubrication systems or both. More particularly the invention relates to a mechanism for assuring continuous liquid pick up from the tank or continuous venting thereof, or both, irrespective of aircraft or aircraft engine attitude.

The invention has in view an improved mechanism of the kind described featuring the use of a pendulum constructed and arranged to obviate misoperation under critical operating conditions.

Other objects and structural details of the invention will appear from the following description when read in connection with the accompanying drawing, wherein:

FIG. 1 is a view in side elevation of a tank adapted in accordance with the instant invention, the side of the tank being partly broken away to show a portion of the interior thereof; and FIG. 2 is a detail view of a weighted pendulum showing its manner of attachment in the tank.

While applicable generally to tanks of the kind described, in the interests of simplicity and convenience the invention is here disclosed as embodied in a tank as shown and described in the patent to F. E. Carroll, Jr. et al., Number 2,800,975 issued July 30, 1957 for Liquid Storage Tank for Use In Vehicles. Briefly, and as shown herein, such a tank comprises a shell 10 suitably equipped with inlet and outlet fittings for movement of a confined liquid to and from the tank and with a vent outlet whereby airs and gases which collect in the tank above the liquid level may be allowed to escape from the tank.

In an intermediate horizontal plane of the shell 10 is a shaft 11 having its opposite ends mounted in laterally spaced apart housing sections 12 and 13, these being in turn secured to opposing walls of the shell 10. The shaft 11 has end peripheral lands 14 and 15 as well as a centrally positioned peripheral land 16. On the former are respective bearings 17 and 18 providing an anti-friction mounting for a cylindrical body 19. The peripheral land 16 mounts an oil seal which in conjunction with the body 19 and bearings 17 and 18 defines interior chambers 21 and 22 in the body. The former communicates through body ports 23 with a chamber 24 in housing section 12 defined in part by an oil seal 25 intermediate the housing section 12 and the exterior of body 19. The chamber 24 is connected by way of an extension tube 26 to a port or opening (not shown) in the wall of shell 10. The chamber 22 in body 19 is connected by ports 27 to a chamber 28 in the housing section 13 defined in part by an oil seal 29 like the seal 25 and similarly disposed. The chamber 28 is connected (in a manner not here shown) to a port or opening in the shell 10 by means of a conduit like the conduit 26.

The chamber 21 further communicates with one end of a conduit or tube 31 which projects radially of the body 19 outwardly into the shell 10. Similarly the chamber 22 communicates with one end of a conduit or tube 32 also reaching out into the tank shell from the body 19 and diametrically opposed to the tube 31. The outer ends of the tubes 31 and 32 are open to communicate the tank shell interior with the chambers 21 and 22 respectively of the body 19.

On the exterior of the body 19 is a projecting lug 33 in which is installed a bearing 34. A pendulum 35 has its one end bifurcated to embrace the lug 33 and a pin 36 extends through the bifurcated end of the pendulum and through the bearing 34 in a manner to attach the pendulum to the body 19 for relative swinging motion. The pendulum 35 extends outwardly in the shell 10 and is formed at its opposite or outer end with an enlarged weighted portion 37.

Under the influence of the weighted pendulum 35 a normal position of rotary adjustment of the body 19 is defined placing the tubes 31 and 32 in a generally vertical position in the tank shell, tube 31 extending downwardly in the shell and the tube 32 extending upwardly therein. Having regard to what may be considered a normal tank attitude the shell 10 has a normal lower portion into which conduit 31 projects and a normal upper portion into which tube 32 projects. The tank shell contains a body of liquid, as for example up to a level indicated by a line 38 and in accordance with the construction and arrangement of parts the tube 32 has a length to project above the liquid level. The outer end of tube 31 is of course submerged in the liquid body. Under the influence of suitable pumping means liquid is drawn from the tank shell 10 by way of the tube 31, flowing into the chamber 21 in body 19 and to a tank outlet by way of tube 26. Tube 32 serves as a vent, connecting the space above the liquid level to the chamber 22 in body 19 which is in turn open to the tank shell exterior by way of ports 27 and chamber 28. This relative position of the parts, wherein the tube 31 projects into and is submerged by the contained body of liquid and wherein tube 32 projects above the liquid level, is maintained despite changing tank attitudes involving fore and aft tilting motions corresponding in aircraft usage to climbing and diving attitudes. These changing attitudes induce rotary adjustment on the part of body 19 under the influence of pendulum 35, such changes being matters of degree with an inverted flight position placing the tank shell in an upside down position as compared to FIG. 1 wherein the tube 31 in effect reaches into the normal upper portion of the tank interior and the tube 32 reaches into the normal lower portion.

An inverted position may also be reached by a roll maneuver in which the tank is turned bodily about a lateral axis and such a motion could conceivably result in the balancing of an attached pendulum in a manner obviating its self positioning function. The instant pendulum, however, resists such balancing and is enabled to turn freely in the bearing 34 to shift the center of gravity of the body 19 and associated parts to insure an adjustment thereof properly locating the tubes 31 and 32 in relation to the contained liquid body. The bifurcated inner end of the pendulum 35 is formed with angled shoulders 39 and 41 engageable with a surface 42 on the body 19. Thus the pendulum may swing relatively to the body 19 and to tube 31 through a limited arc at the terminals of which it contacts the body 19 so that continued motion of the pendulum in the same direction is accompanied by a corresponding movement of the body 19 and the attached tubes 31 and 32. Any tendency of the pendulum to remain at a neutral position when an inverted flight attitude is reached through a 180° roll of the engine or of the aircraft and engine combination is avoided through a shift of the center of gravity of the weighted pendulum. The weighted pendulum is hinged so that it may rotate approximately 20° to either side of a central or neutral position. The resultant center of gravity shift when the weight moves from a neutral position to one or another of its extremes creates a moment arm in excess of the break away torque required for rotation of the body 19. The mechanism operates not only in respect of an operating aircraft but also in connection with build up procedures of the engine of which the tank may be an accessory.

What is claimed is:

1. A liquid storage tank subject in use to changing attitude, comprising a shell enclosure holding a liquid body, relatively rotatable conduit means in said tank including a body member supported by said shell in an intermediate transverse plane thereof and rotatable relative to said shell, a weighted pendulum suspended from said body member for relative swinging motion, said pendulum tending to occupy a neutral hanging position despite changing tank attitudes whereby to hold said body normally against rotation with the shell, and means limiting swinging motion of said weighted pendulum relative to said body member whereby said pendulum may provide an impulse moment in excess of the break away torque required for rotation of the body in the event of the body remaining at a neutral position under an inverted shell attitude, said motion limiting means comprising shoulders on said weighted pendulum adapted to abut said body member after a predetermined swinging motion of the pendulum in either direction from a neutral hanging position relative to the body.

2. A liquid storage tank according to claim 1, characterized in that the said shoulders on said pendulum are so formed and arranged relative to the body to limit motion of the pendulum with respect to the body member to approximately 20° to either side of a neutral position.

References Cited in the file of this patent
UNITED STATES PATENTS

| | | |
|---|---|---|
| 2,619,102 | Endress | Nov. 25, 1952 |
| 2,835,263 | Klank | May 20, 1958 |